(12) United States Patent
Parsche (10) Patent No.: US 8,932,435 B2
(45) Date of Patent: Jan. 13, 2015

(54) HYDROCARBON RESOURCE PROCESSING DEVICE INCLUDING RADIO FREQUENCY APPLICATOR AND RELATED METHODS

(75) Inventor: Francis Eugene Parsche, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 706 days.

(21) Appl. No.: 13/208,415

(22) Filed: Aug. 12, 2011

(65) Prior Publication Data

US 2013/0037262 A1 Feb. 14, 2013

(51) Int. Cl.
*C01G 15/00* (2006.01)
*C10G 1/00* (2006.01)
*C10G 1/04* (2006.01)

(52) U.S. Cl.
CPC .. *C10G 1/00* (2013.01); *C10G 1/04* (2013.01); *C10G 2400/02* (2013.01)
USPC .................. 204/172; 204/157.6; 204/157.15; 204/157.43; 204/164; 204/168; 422/186; 422/186.29

(58) Field of Classification Search
CPC ........ C10G 1/00; C10G 1/04; C10G 2400/02; C10G 15/08; C10G 9/24
USPC ............. 422/186, 186.29; 204/157.6, 157.15, 204/157.43, 164, 168, 172
See application file for complete search history.

(56) References Cited

U.S. PATENT DOCUMENTS

| | | | |
|---|---|---|---|
| 3,932,365 A | 1/1976 | Penisson | 260/78 R |
| 3,948,666 A | 4/1976 | Kitanishi et al. | 96/115 P |
| RE28,868 E | 6/1976 | Spaeder, Jr. | |
| 4,064,062 A | 12/1977 | Yurko | 252/99 |
| 4,206,100 A | 6/1980 | Kyo et al. | 260/22 R |
| 4,231,535 A | 11/1980 | Schlegel et al. | 244/110 |
| 4,258,154 A | 3/1981 | Kyo et al. | 525/425 |
| 4,390,410 A | 6/1983 | Audeh | 208/8 LE |

(Continued)

FOREIGN PATENT DOCUMENTS

| WO | 2010101846 | 9/2010 |
|---|---|---|
| WO | 2012138608 | 10/2012 |

OTHER PUBLICATIONS

Bridges et al., "Radio-Frequency Heating to Recover Oil From Utah Tar Sands", The Future of Heavy Crude Oils and Tar Sands, New York, Mining Informational Services, McGraw-Hill, Chapter 44, pp. 1-14.

(Continued)

*Primary Examiner* — Xiuyu Tai
(74) *Attorney, Agent, or Firm* — Allen, Dyer, Doppelt, Milbrath & Gilchrist, P.A.

(57) ABSTRACT

A hydrocarbon resource processing device may include a radio frequency (RF) source and an RF applicator coupled to the RF source. The RF applicator may include a base member being electrically conductive, and first and second elongate members being electrically conductive and having proximal ends coupled to the base member and extending outwardly therefrom in a generally parallel spaced apart relation. The first and second elongate members may have distal ends configured to receive the hydrocarbon resource therebetween. In another embodiment, the RF applicator may include an enclosure being electrically conductive and having a passageway therethrough to accommodate a flow of the hydrocarbon resource and a divider being electrically conductive and positioned within the enclosure.

18 Claims, 8 Drawing Sheets

(56) References Cited

U.S. PATENT DOCUMENTS

| | | | | |
|---|---|---|---|---|
| 4,438,293 A | 3/1984 | Voser | | 174/79 |
| 4,505,100 A | 3/1985 | Yoshiyuki et al. | | 57/207 |
| 4,645,585 A | 2/1987 | White | | 208/58 |
| 4,699,841 A | 10/1987 | Kundinger et al. | | 428/332 |
| 4,705,720 A | 11/1987 | Kundinger et al. | | 428/332 |
| 4,789,718 A | 12/1988 | Noll et al. | | 528/49 |
| 4,806,375 A | 2/1989 | Favre | | 426/433 |
| 4,985,193 A | 1/1991 | Allen | | 264/184 |
| 5,055,180 A * | 10/1991 | Klaila | | 208/402 |
| 5,124,436 A | 6/1992 | Keil et al. | | 528/331 |
| 5,232,605 A | 8/1993 | Baur et al. | | 210/761 |
| 5,463,003 A | 10/1995 | Horikawa et al. | | 526/176 |
| 5,463,004 A | 10/1995 | Horikawa | | 526/176 |
| 5,863,362 A | 1/1999 | Creech | | 152/527 |
| 6,103,059 A | 8/2000 | Call | | 162/65 |
| 6,156,867 A | 12/2000 | Aoyama et al. | | 528/282 |
| 6,159,121 A | 12/2000 | Di Giacomo et al. | | 474/205 |
| 6,200,046 B1 | 3/2001 | Rylander | | 401/52 |
| 6,344,518 B1 | 2/2002 | Kobayashi et al. | | 524/862 |
| 6,362,272 B1 | 3/2002 | Tadaki et al. | | 524/555 |
| 6,388,225 B1 * | 5/2002 | Blum et al. | | 219/121.48 |
| 6,548,598 B2 | 4/2003 | Takeuchi et al. | | 525/68 |
| 6,673,423 B2 | 1/2004 | Kranenburg-Van Dijk et al. | | 428/203 |
| 6,875,825 B2 | 4/2005 | Kaneko et al. | | 525/526 |
| 6,942,757 B1 | 9/2005 | Iwama et al. | | 162/157.3 |
| 7,230,052 B2 | 6/2007 | Kaneko et al. | | 525/113 |
| 7,288,690 B2 | 10/2007 | Bellet et al. | | 585/648 |
| 7,312,428 B2 | 12/2007 | Kinzer | | 219/772 |
| 7,381,290 B2 * | 6/2008 | Hall et al. | | 156/345.41 |
| 7,468,342 B2 | 12/2008 | Kanamori et al. | | 502/327 |
| 7,629,497 B2 | 12/2009 | Pringle | | 585/241 |
| 7,714,258 B2 | 5/2010 | Dalton | | 219/759 |
| 2005/0199386 A1 | 9/2005 | Kinzer | | |
| 2009/0272653 A1 * | 11/2009 | Beech et al. | | 205/343 |
| 2009/0283257 A1 | 11/2009 | Becker | | 166/248 |
| 2010/0218940 A1 | 9/2010 | Parsche | | 166/248 |
| 2010/0219105 A1 | 9/2010 | White et al. | | 208/391 |
| 2010/0219106 A1 | 9/2010 | White et al. | | 208/391 |
| 2010/0219107 A1 | 9/2010 | Parsche | | 208/402 |
| 2010/0219108 A1 | 9/2010 | Parsche | | 208/402 |
| 2010/0219182 A1 | 9/2010 | Parsche | | 219/660 |
| 2010/0219184 A1 | 9/2010 | Parsche | | 219/747 |
| 2010/0219843 A1 | 9/2010 | Hernandez et al. | | 324/663 |
| 2010/0223011 A1 | 9/2010 | Parsche | | 702/11 |
| 2012/0012575 A1 | 1/2012 | Parsche | | |
| 2012/0247945 A1 | 10/2012 | Parsche | | |

OTHER PUBLICATIONS

Moore et al., "Fracturing of Oil Shale Using Radio-Frequency Electromagnetic Energy and Retorting At 915 MHZ", U.S. Department of Energy, Office of Fossil Energy, Morgantown Energy Technology Center, Laramie Project Office, Laramie, Wyoming, Nov. 1988, pp. 1-30.

* cited by examiner

HYDROCARBON RESOURCE PROCESSING DEVICE INCLUDING RADIO FREQUENCY APPLICATOR AND RELATED METHODS

FIELD OF THE INVENTION

The present invention relates to the field of hydrocarbon resource processing, and, more particularly, to hydrocarbon resource processing devices including radio frequency applicators and related methods.

BACKGROUND OF THE INVENTION

A hydrocarbon resource may be particularly valuable as a fuel, for example, gasoline. One particular hydrocarbon resource, bitumen, may be used as a basis for making synthetic crude oil (upgrading), which may then be refined into gasoline. Accordingly, bitumen, for example, may be relatively valuable. More particularly, to produce 350,000 barrels a day of bitumen based synthetic crude oil would equate to about 1 billion dollars a year in bitumen. Moreover, about 8% of U.S. transportation fuels, e.g., gasoline, diesel fuel, and jet fuel, are synthesized or based upon synthetic crude oil.

In the hydrocarbon upgrading or cracking process, hydrogen is added to carbon to make gasoline, so, in the case of bitumen, natural gas is added to the bitumen. Natural gas provides the hydrogen. Bitumen provides the carbon. Certain ratios and mixes of carbon and hydrogen are gasoline, about 8 carbons to 18 hydrogens, e.g. $CH_3(CH_2)_6CH_3$. Gasoline is worth more then either bitumen or natural gas, and thus the reason for its synthesis.

One process for cracking the hydrocarbons is fluid catalytic cracking (FCC). In the FCC process, hot bitumen is applied to a catalyst, for example, $AlO_2$, at 900° C. with a relatively small amount of water to form synthetic crude oil. However, the FCC process has a limited efficiency, about 70%. The residual, also known as coke, is worth far less. Moreover, coke residues stop the FCC process, and the there is an increased risk of fires and explosions. The FCC process also has a poor molecular selectivity, and produces relatively high reactant emissions, especially ammonia. The catalyst used in the FCC process also has a relatively short lifespan.

Several references disclose application of RF to a hydrocarbon resource to heat the hydrocarbon resource, for example, for cracking. In particular, U.S. Patent Application Publication No. 2010/0219107 to Parsche, which is assigned to the assignee of the present application, discloses a method of heating a petroleum ore by applying RF energy to a mixture of petroleum ore and susceptor particles. U.S. Patent Application Publication Nos. 2010/0218940, 2010/0219108, 2010/0219184, 2010/0223011, 2010/0219182, all to Parsche, and all of which are assigned to the assignee of the present application disclose related apparatuses for heating a hydrocarbon resource by RF energy. U.S. Patent Application Publication No. 2010/0219105 to White et al. discloses a device for RF heating to reduce use of supplemental water added in the recovery of unconventional oil, for example, bitumen.

Several references disclose applying RF energy at a particular frequency to crack the hydrocarbon resource. U.S. Pat. No. 7,288,690 to Bellet et al. discloses induction heating at frequencies in the range of 3-30 MHz. More particularly, radio frequency magnetic fields are applied to ferrous piping that includes hydrocarbons. The magnetic fields induction heat the ferrous piping and the hydrocarbons inside are warmed conductively. Application Publication No. 2009/0283257 to Becker discloses treating an oil well at a frequency range of 1-900 MHz and no more than 1000 Watts, using a dipole antenna, for example.

Further improvements to hydrocarbon resource upgrading may be desirable. For example, it may be desirable to increase the efficiency of the bitumen to gasoline conversion process, i.e. upgrading, by making it quicker and cheaper, for example.

SUMMARY OF THE INVENTION

In view of the foregoing background, it is therefore an object of the present invention to increase the efficiency of hydrocarbon resource upgrading.

This and other objects, features, and advantages in accordance with the present invention are provided by an apparatus for processing a hydrocarbon resource including a radio frequency (RE) source, and an RF applicator coupled to the RE source. The RE applicator includes a base member that is electrically conductive. The RF applicator also includes first and second elongate members that are electrically conductive and have proximal ends coupled to the base member and extending outwardly therefrom in a generally parallel spaced apart relation. The first and second elongate members have distal ends configured to receive a hydrocarbon resource therebetween. The RF source and the RE applicator are configured to generate electrical fields between the distal ends of the first and second elongate members to perform at least one of heating, dehydrating, cracking and hydrogenation of the hydrocarbon resource, for example. Accordingly, the hydrocarbon resource processing apparatus may provide increased efficiency in hydrocarbon resource upgrading.

The apparatus may include an enclosure being electrically conductive and surrounding the RF applicator, for example. The enclosure may have a passageway therethrough aligned with the distal ends of the first and second elongate members to accommodate a flow of the hydrocarbon resource therebetween, for example.

The RF applicator may further include first and second plates being electrically conductive and coupled to respective distal ends of the first and second elongate members. The first and second plates may be arranged in parallel opposing relation, for example.

The RF applicator may further include at least one tuning member coupled between the first and second elongate members. The apparatus may further include a coaxial feedline coupling the RF source to the first and second elongate members, for example. The RF source may be configured to supply RF power at 27 MHz, for example.

The may further include a hydrocarbon separator downstream from the RF applicator and being configured to generate hydrocarbon fractions. The apparatus may further include a hydrocarbon processor downstream from the hydrocarbon separator and being configured to generate at least one liquid fuel from the hydrocarbon fractions. The hydrocarbon resource may include at least one of oil sand, bitumen, pipeline diluted bitumen, crude oil, and synthetic crude oil, for example.

A related method aspect is directed to a method for processing a hydrocarbon resource. The method includes applying radio frequency (RF) power from an RF source to an RF applicator coupled to the RF source. The RF applicator includes a base member that is electrically conductive, and first and second elongate members that are electrically conductive and may have proximal ends coupled to the base member and extending outwardly therefrom in a generally parallel spaced apart relation. The first and second elongate members have distal ends. The method further includes flowing the hydrocarbon resource between the distal ends to process the hydrocarbon resource with the RF power.

Another aspect is directed to another apparatus embodiment for processing a hydrocarbon resource. The apparatus includes a radio frequency (RF) source and an RF applicator coupled to the RF source. The RF applicator includes an enclosure being electrically conductive and having a passageway therethrough to accommodate a flow of a hydrocarbon resource. The RF applicator also includes a divider being electrically conductive and positioned within the enclosure.

The RF source and the RF applicator may be configured to perform at least one of heating, dehydrating, cracking and hydrogenation of the hydrocarbon resource, for example. The divider may have an elongate shape with opposing ends coupled to adjacent portions of the enclosure and with opposing sides spaced inwardly from adjacent portions of the enclosure. The divider may have a convex shape, for example.

A related method aspect is directed to a method for processing a hydrocarbon resource. The method includes applying radio frequency (RF) power from an RF source to an RF applicator coupled to the RF source. The RF applicator includes an enclosure being electrically conductive and having a passageway therethrough to accommodate a flow of the hydrocarbon resource, and a divider being electrically conductive and positioned within the enclosure. The method further includes flowing the hydrocarbon resource through the passageway to process the hydrocarbon resource with the RF power.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple notation is used to indicate similar elements in alternative embodiments.

Figure 1:
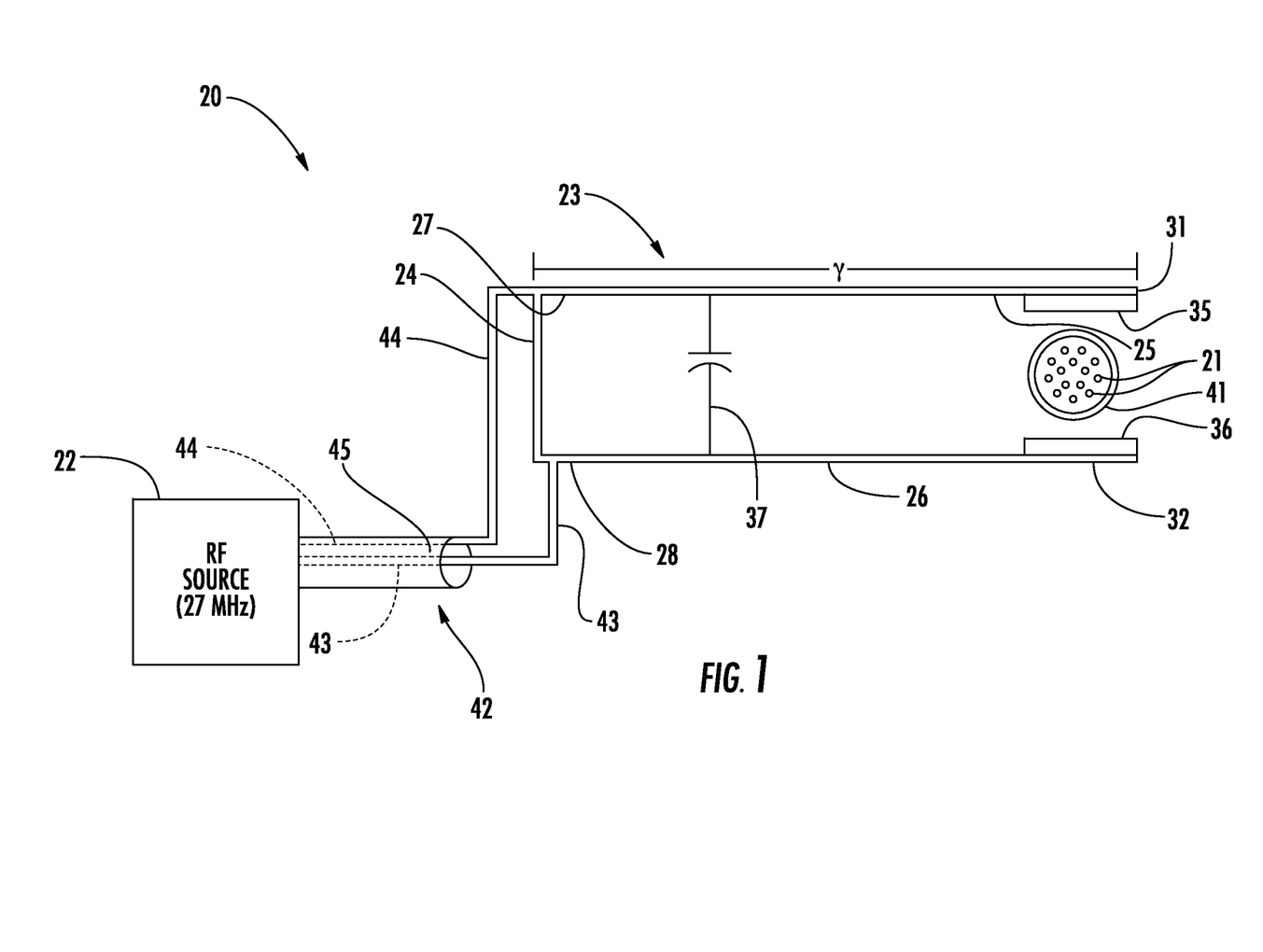
FIG. 1 is a schematic diagram of a portion of an apparatus for processing a hydrocarbon resource in accordance with the present invention.
Figure 2:
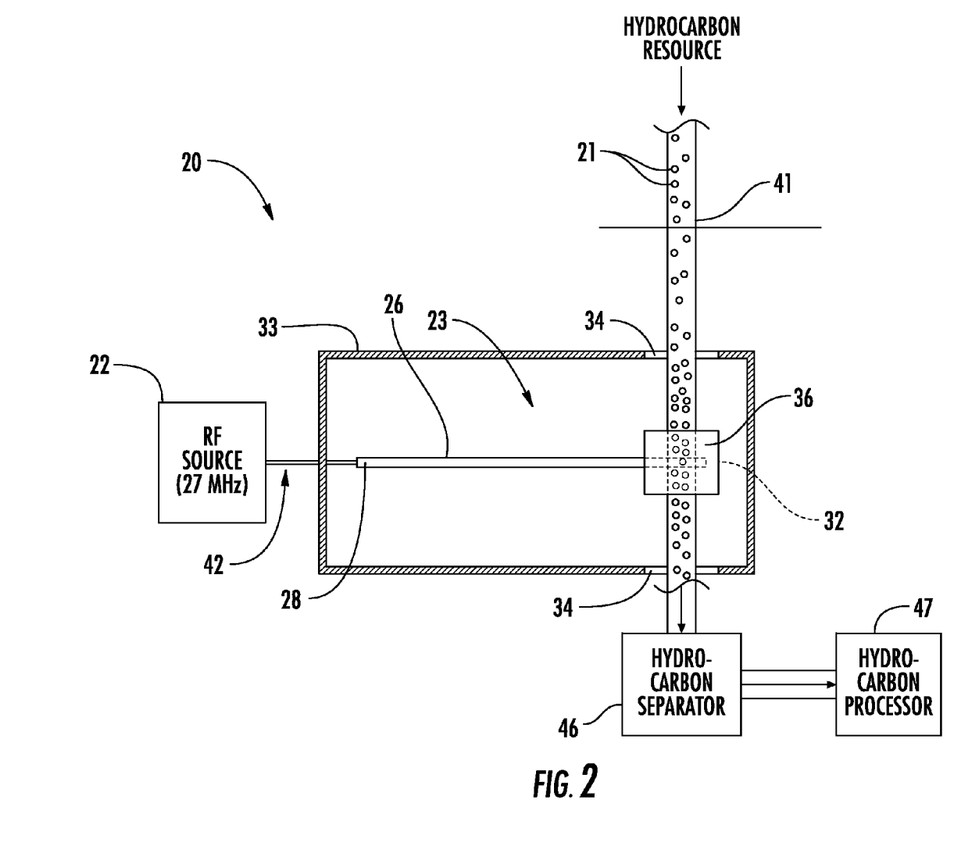
FIG. 2 is a schematic diagram of the apparatus in FIG. 1 including a cross-sectional view of the enclosure.

Referring initially to FIGS. 1 and 2, an apparatus 20 for processing a hydrocarbon resource 21 is illustrated. The hydrocarbon resource 21 may be at least one of oil sand, bitumen, pipeline diluted bitumen, crude oil, and synthetic crude oil, for example. The hydrocarbon resource 21 may be transported by conduit 41, which may include a pipeline, which may be round, square, or other shape, and that may have a dielectric casing, or a gravity feed chute, for example. In other embodiments the hydrocarbon resource 21 may be transported by a conveyor belt or shake table.

The apparatus 20 includes a radio frequency (RF) source 22 and an RF applicator 23 coupled to the RF source. The RF source 22 is configured to supply RF power at 27 MHz, and, more particularly, at 27.12 MHz. As will be appreciated by those skilled in the art, 27.12 MHz is an antiresonance frequency of water so that the RF energy propagates relatively deeply into the hydrocarbon resource 21. The RF applicator 23 may be considered an electrically small structure with most dimensions smaller than one wavelength $\lambda$, for example. A hydrocarbon resource 21 that has passed through the RF applicator 23 may be considered treated. The hydrocarbon resource 21 may be batch treated or treated as a continuous flow or stream.

The RF applicator 23 includes a base member 24 that is electrically conductive. The RF applicator 23 also includes first and second elongate members 25, 26 that are electrically conductive and have proximal ends 27, 28 coupled to the base member 24 and extending outwardly therefrom in a generally parallel spaced apart relation. The first and second elongate members 25, 26 have distal ends 31, 32 configured to receive the hydrocarbon resource therebetween. Thus, the RF applicator 23 may be considered an "RF heating fork". The RF applicator 23 may be a metallic material, for example. Of course, the RF applicator 23 may be another electrically conductive material. The elongate dimension $\gamma$ of the RF applicator 23 may preferably be about a quarter wavelength at the operating frequency so that natural resonance may be obtained electrically.

A coaxial feedline 42 illustratively couples the RF source 22 to the first and second elongate members 25, 26. The coaxial feedline 42 includes an inner conductor 43 and outer conductor 44. A dielectric material layer 45 is between the inner conductor 43 and the outer conductor 44. The inner conductor 43 is illustratively coupled to the second elongate member 26 and the outer conductor 44 is coupled to first conductor 25. The coupling location of the inner conductor 43 to the second elongate members 26 may advantageously determine a resistance.

Other connection arrangements between the coaxial feedline 42 and the RF applicator 23 may also be used, such as, for example. More particularly, jumpers from the inner conductor 43 and outer conductor 44 may be connected at various locations along the first and second elongate members 25, 26 to obtain any desired electrical load resistance from the RF applicator 23. For example, when the inner conductor 43 and outer conductor 44 are connected to the RF applicator 23 at the base member 24, a low resistance is obtained, and when the inner conductor 43 and outer conductor 44 are connected near the distal ends 31, 32, a high resistance is obtained. The 50 ohms point is relatively close to or along the base member 24 when the RF applicator 23 is unloaded by hydrocarbons.

The RF source 22 and the RF applicator 23 are configured to generate electrical fields between the distal ends 31, 32 of the first and second elongate members 25, 26. The electrical fields between the distal ends 31, 32 advantageously perform at least one of heating, dehydrating, cracking, and hydrogenation of the hydrocarbon resource 21, for example. In other words, the first and second elongate members 25, 26 provide a parallel conductor transmission line, a distributed impedance matching element, or distributed linear transformer.

As will be appreciated by those skilled in the art, current and voltage have a sine and cosine relationship along the first and second elongate members 25, 26, and field impedance, the ratio of the near electric to the near magnetic fields, varies with the tangent function. The RF applicator 23 generates primarily near fields, although far field radiation may also be generated. Additionally, high voltage may be developed between the distal ends 31, 32, and high currents may be developed in the base member 24. Strong electric fields may also be formed between the distal ends 31, 32, and strong magnetic fields may be formed near the base member 24.

Moreover, different chemical effects have been observed at either end of the RF applicator 23, and magnetic fields at the base member 24 may be effective in converting aromatic molecules to polar molecules, and electric fields between the distal ends 31, 32 have been effective in cracking hydrocarbons. In some instances, more than one RF applicator 23 may be used to apply both electric and magnetic fields. As will be appreciated by those skilled in the art, heating, dehydrating, cracking, and hydrogenation of the hydrocarbon resource 21 is a relatively important step in upgrading or synthesizing the hydrocarbon resource to produce, gasoline or other transportation fuels, for example.

The RF applicator 23 also includes first and second plates 35, 36 that are also electrically conductive and coupled to respective distal ends 31, 32 of the first and second elongate members 25, 26. The first and second plates 35, 36 are illustratively arranged in parallel opposing relation. The first and second plates 35, 36 advantageously increase the uniformity of the parallel electrical fields. More particularly, nearly straight flux line electric fields are provided between the first and second plates 35, 36. In other words, without the first and second plates 35, 36 non-uniform heating or hot-spots may occur.

The RF applicator 23 further includes a tuning member 37 coupled between the first and second elongate members 31, 32. The tuning member 37 is illustratively a capacitor. The tuning member 37 may be another device, component, or circuitry to adjust the frequency of the electric field. Of course, more than one tuning member 37 may be used and/or more than one type of tuning member may be used. A larger value capacitive tuning member 37 may be used allow shorter elongate dimension γ and an inductive tuning member 37 may be used to allow a longer elongate dimensions γ.

Setting the RF source 22 to the spot frequency of 27 MHz, or, more particularly, 27.12 MHz, has the synergy of reducing residual water heating. Using the water antiresonance frequency is particularly advantageous with bitumen as the hydrocarbon resource, for example, as the bitumen readily cracks at that frequency, water heating is reduced at that frequency, and penetration depth, or half depth of penetration of the electric field, is increased at that frequency. The joined aromatic ring molecules (polycyclics) are separated from one another "cracking" the oil. Of course, the RF applicator 23 may be used at frequencies away from 27 MHz if increased water heating or dessication is desired.

Since bitumen ore, for example, may include up to 15 percent water and "dewatered bitumen," for example, may include 1 to 2% water residue, it may be of particular interest that RF fields attack the bitumen instead of the water. Operation on a molecular resonance spot frequency may not be needed to RF heat a material, as confirmed by testing.

The RF source 22 may be adjusted to control the heating of the hydrocarbon resource 21, for example, to a desired temperature or level. For example, RF power may be reduced when at 100% desiccation to control the rise of the temperature and/or manage the loss of evaporative cooling. A controller or other circuitry may be included to adjust the RE source power based upon, for example, temperature, desiccation, and time.

The apparatus 20 also includes an enclosure 33 that is electrically conductive and surrounds the RF applicator 23 (FIG. 2). The enclosure 33 has a passageway 34 therethrough aligned with the distal ends 31, 32 of the first and second elongate members 25, 26 to accommodate a flow of the hydrocarbon resource 21 therebetween. The enclosure 33 may be operable as an electrical field shield, for example. The enclosure 33 may be a metallic material, for example. Of course, the enclosure 33 may be another electrically conductive material.

The apparatus 20 may further include a hydrocarbon separator 46 downstream from the RF applicator 23. The hydrocarbon separator 46 may be configured to generate hydrocarbon fractions as will be appreciated by those skilled in the art. The hydrocarbon separator 46 may also retort the hydrocarbon resource 21. The apparatus 20 may further include a hydrocarbon processor 47 downstream from the hydrocarbon separator 46. The hydrocarbon processor 47 may be configured to generate a liquid fuel from the hydrocarbon fractions as will be appreciated by those skilled in the art. The hydrocarbon processor 47 may also be configured to hydrogenate and/or reformate the hydrocarbon resource, for example. For example, gasoline may be generated from the hydrocarbon fractions. Of course, other types of liquid fuels may be generated from the hydrocarbon fractions.

As will be appreciated by those skilled in the art, the apparatus 20 may provide lower cracking temperature so little to no coking over thermal cracking and fluid catalytic cracking, for example. In contrast, a fluid catalytic cracker (FCC) as in the prior art has to be shut down and the coke ground out mechanically.

When insoluble asphaltenes are deposited on an FCC hot heat exchanger surface, they may form coke, depending on the time and temperature. Above 370° C. this reaction is almost instantaneous and below 200° C. it typically does not happen in many years. The significance is that once coke forms, it cannot be redissolved in the oil or any solvent. This is the reason that the fouling of the highest temperature heat exchanger in the crude unit is usually the greatest even though asphaltene solubility is more at higher temperatures. Once asphaltenes are insoluble at lower temperatures, the time scale of redissolution is much longer than the time it takes the crude to flow through the crude unit as the crude is heated to higher temperatures.

A prototype apparatus similar to that described above with respect to FIGS. 1 and 2 was used with bottled samples of asphalt and bitumen for testing purposes. The bitumen sample had about 2% to 3% water. The asphalt sample was powdered anhydrous asphalt crystals. The asphalt sample did not react chemically in the test.

The bitumen sample was held in an open-top glass bottle. The glass bottle was surrounded by a Teflon frame including a Teflon lid. A nitrogen feed hose was inserted into the Teflon frame adjacent the opening of the glass bottle to provide a nitrogen flood. The nitrogen flood advantageously reduces reactions with atmospheric oxygen, for example, so that the chance of a fire was reduced. A thermometer was also inserted into the Teflon frame adjacent the opening of the glass bottle. The Teflon frame with the glass bottle was placed between the first and second plates.

The RF power source was set to the 27.12 MHz antiresonance frequency of liquid water. The equipment used for the test included a Bird 4421 power meter, a Palstar AT5K impedance matching unit, an HP 8656B signal generator, and a Continental 618 RF power amplifier, which is capable of producing up to 2000 Watts at the 27.12 MHz frequency.

Energy maps were simulated for the glass bottle of bitumen. The energy sample maps were taken along the X-Y plane cut in a plan view at 6.78 MHz, 150 Watts to the first and second elongate members, and at time t=0. The energy maps showed that inside the bitumen there was an electric field of 1600 v/m, a magnetic field (H-field) of 0.12 A/m, heating at a volume loss density of 14 W/m³, and a referred electric current (induced) in the bitumen of amplitude 0.23 A/m³. Relatively strong electric fields were predominant within the glass bottle. In other words, 1600 volts per meter and 0.12 amps per meter is a very high E-field strength relative to H-field strength. In free space and for radio waves, a 1600 volts per meter E-field would be accompanied by a 1600/120π=2.24 amps per meter H-field. The E to H field ratio (impedance Z) was 2.24/0.12=12 times higher than for radio waves. The field impedance in the test was Z=E/H=1600/0.12=13333 ohms.

Figure 3:
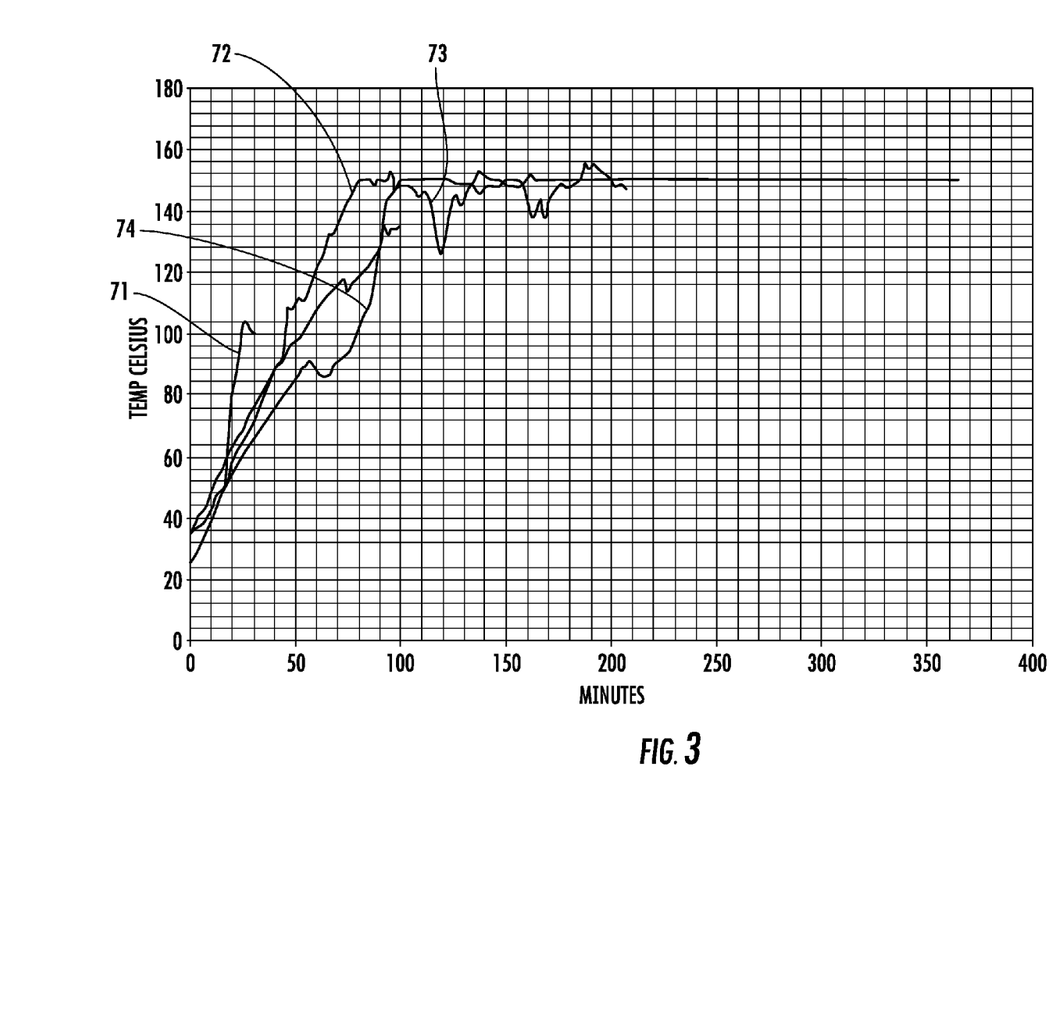
FIG. 3 is a time versus temperature graph of four samples of the hydrocarbon resource treated by the prototype apparatus.

Referring now to the graph in FIG. 3, a time versus temperature graph is illustrated for four different samples of bitumen 71, 72, 73, 74. The electric fields heated the samples.

Several empirical observations were made. First, all of the residual water boiled off as steam. Second, gasses were liberated, however, some gasses condensed in the top of the bottle as thin liquids, likely naptha, for example. A vertical viscosity gradient was also observed through the bottles; light thin liquid hydrocarbons on top, viscous hydrocarbons in the middle, and thick hydrocarbons on the bottom.

Figure 4:
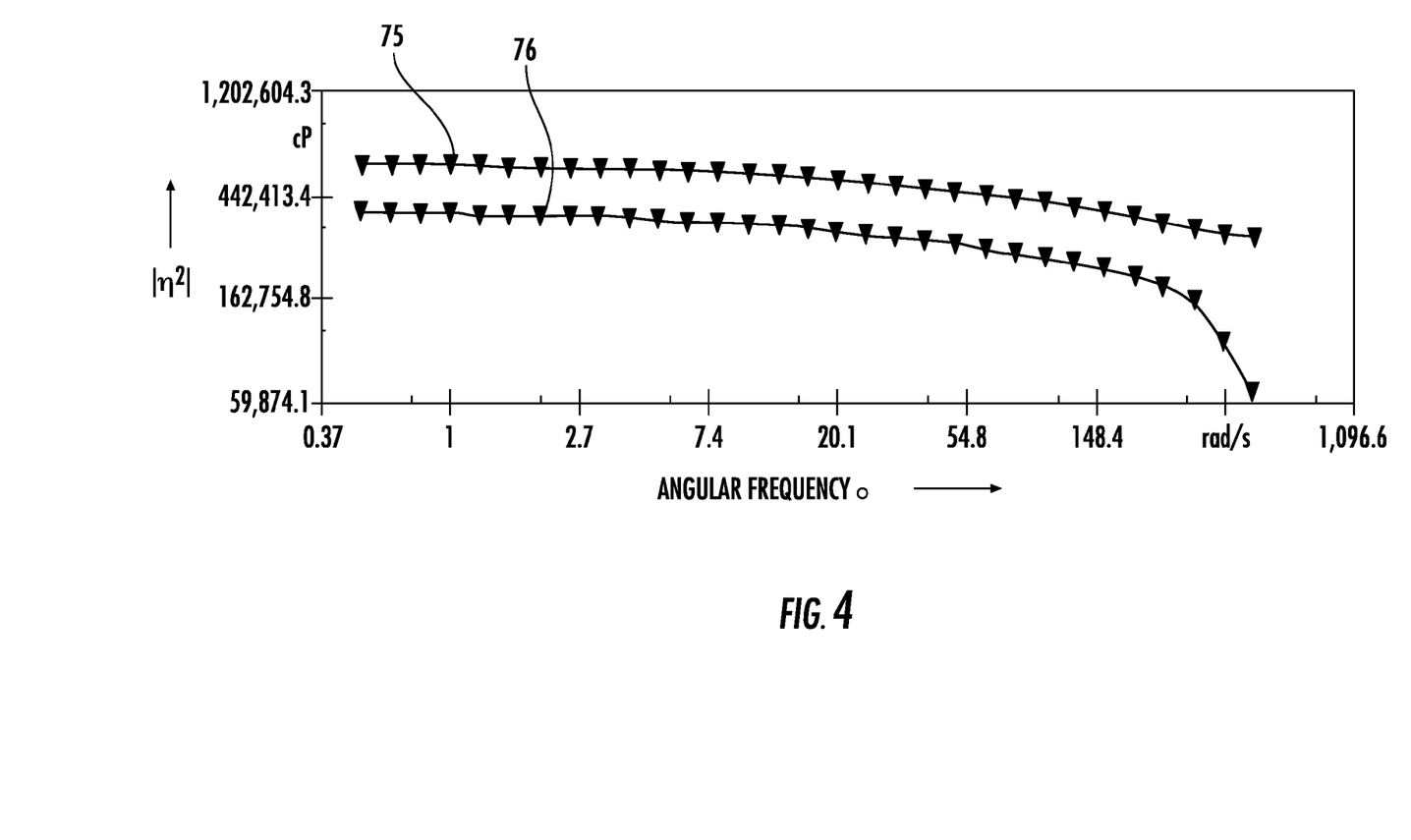
FIG. 4 is a viscosity graph for a hydrocarbon resource before and after treatment by the prototype apparatus.

Referring now to the graph in FIG. 4, viscosity results before heating 75 and after heating 76 are illustrated. The electric fields made the bitumen sample [(5.5×10⁵−3.5×10⁵)/3.5×10⁵]×100%=57% more viscous than the untreated control sample. This is consistent with cracking the hydrocarbon resource and releasing the light volatiles (which were not recovered in this test). In summary, the viscosity increased because the light thin liquid hydrocarbons were boiled off, and the electric fields cracked the hydrocarbon resources. A condenser or fractionating column may of course be provided to capture and separate the lights, as will be appreciated by those skilled in the art.

The test data summary for the prototype apparatus is below in Table. 1

TABLE 1

| Parameter | Value |
| --- | --- |
| Antenna | Parallel conductor fork |
| Transmitter Power | 150 Watts nominal |
| Frequency | ~27.12 MHz (water antiresonance) |
| Realized E Field | 1600 V/m (the predominant applied energy) |
| Realized H Field | 0.12 A/m |
| Realized Volume Loss Density | 14 W/m³ |
| Realized Induced Conduction Current | 0.23 A/m² |
| Process Time | 30 to 360 minutes, depending on the sample |
| # Of Samples Processed | 4 |
| Feedstock | Dewatered Athabasca Bitumen (samples 1-4). Asphalt (sample 5). |
| Sample Size | 113 grams in each bottle |
| Outcome, Physical effects | Heating, fractionation (thin oils on rose to top of the bottle), volitization |
| Outcome, Molecular Effects | Cracking of polycyclics |
| Realized Process | Electromagnetic hydrocarbon cracking |

Figure 5:
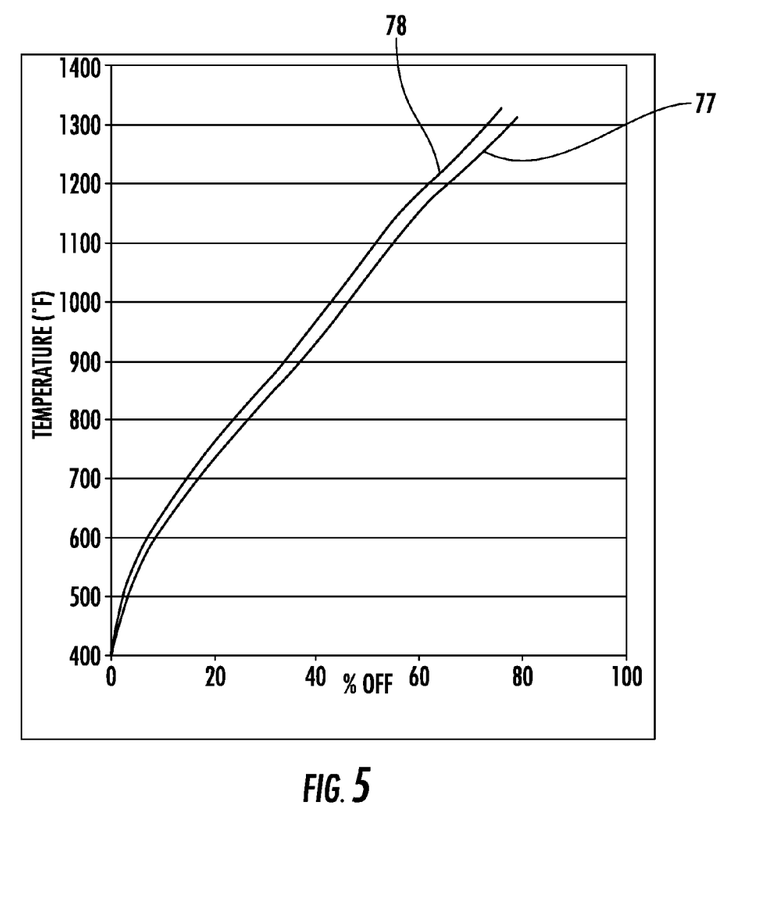
FIG. 5 is a chemical change graph of a hydrocarbon resource treated by the prototype.

Referring now to the graph in FIG. 5, the American Society for Testing and Materials (ASTM) results for the feed bitumen and the product of a thirty minute trial of being exposed to the generated electrical fields. The dehydrated bitumen is illustrated by the line 77, and bitumen exposed to electrical fields is illustrated by line 78. The boiling range of the bitumen shifted relative to the feed bitumen. The shift is consistent with cracking with the subsequent loss of light components, and is demonstrated over the entire range of the boiling point distribution (ASTM D 7169 analysis). This test had the highest initial heating rate but it only reached a maximum temperature of about 104° C., and stayed above 100° C. for a few minutes. It was observed that part of the sample boiled during test.

A method aspect is directed to a method for processing a hydrocarbon resource 21. The method includes applying radio frequency (RF) power from an RF source 22 to an RF applicator 23 coupled to the RF source. The RF applicator 23 includes a base member 24 that is electrically conductive, and first and second elongate members 25, 26 that are electrically conductive and may have proximal ends 27, 28 coupled to the base member and extending outwardly therefrom in a generally parallel spaced apart relation. The first and second elongate members 25, 26 have distal ends 31, 32. The method further includes flowing the hydrocarbon resource 21 between the distal ends 31, 32 to process the hydrocarbon resource with the RF power.

Figure 6:
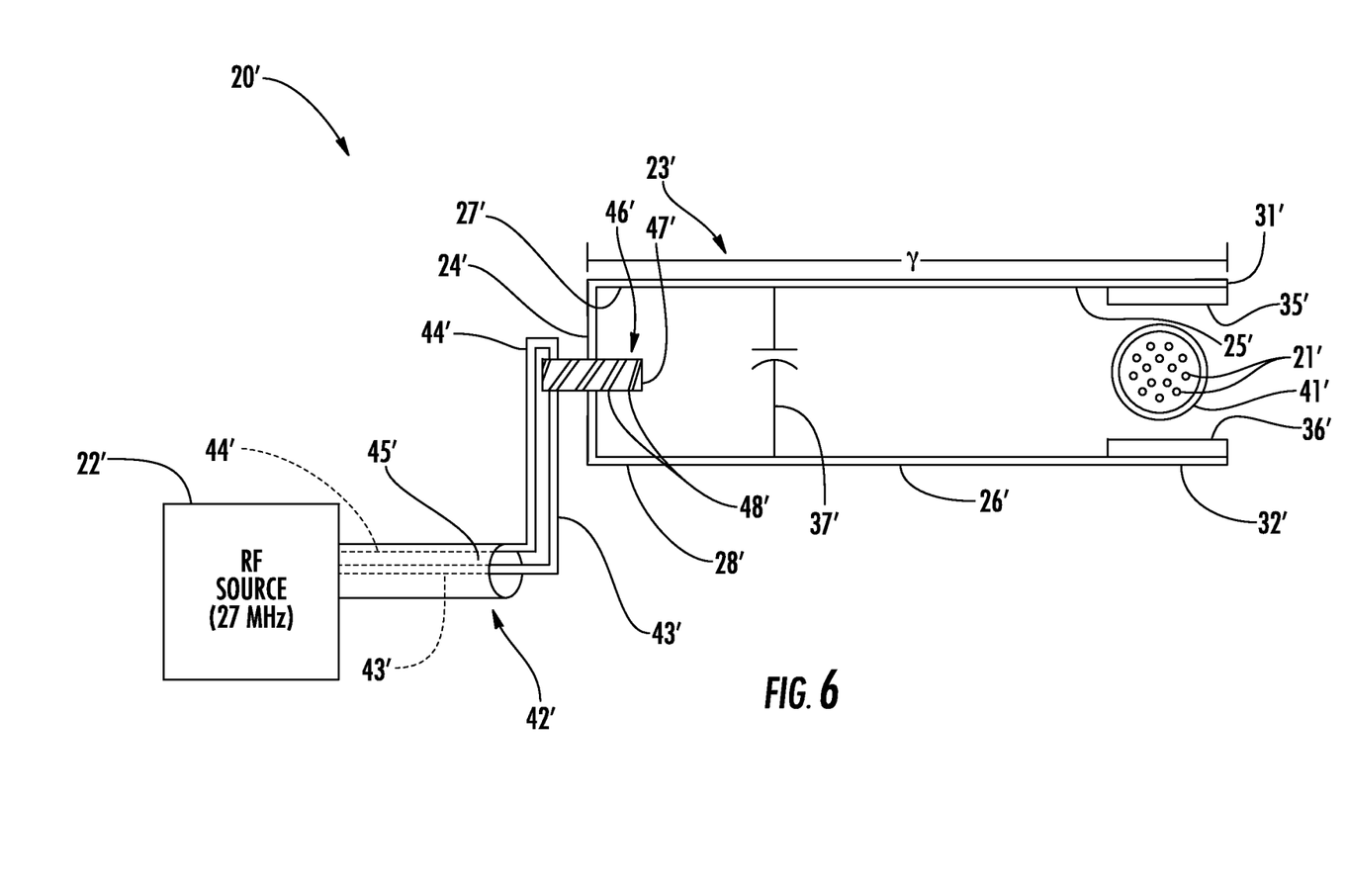
FIG. 6 is a schematic diagram of a portion of an apparatus for processing a hydrocarbon resource in accordance with another embodiment of the present invention.

Referring now to FIG. 6, an apparatus 20' for processing a hydrocarbon resource according to another embodiment is illustrated. The coaxial feedline 42' includes an inner conductor 43' and outer conductor 44'. The coaxial feedline 42' illustratively couples the RF source 22' to the first and second elongate members 25', 26' via a toroidal transformer 46'. The toroidal transformer 46' includes a toroidal core 47' which may be a ferrite or powdered iron core, for example, and a conductive winding 48' around the toroidal core 47'. The inner conductor 43' and the outer conductor 44' each couple to an end of the conductive winding 48'. The base member 24' passes through the toroidal transformer 46' so the conductive winding 48' functions as a transformer primary winding, and the base member functions as a secondary "winding". The base member 24' is not a multiple turn winding in a traditional transformer sense, but rather a fractional turn winding. This advantageously provides 50 ohms, and may provide other electrical load resistances from the RF applicator 23' by adjustment of number of turns in conductive winding 48'. The toroidal transformer 46' may also provide a balun to reduce or eliminate common mode currents from the outside of outer conductor 44', as will be appreciated by those skilled in the art. Additional or other connection arrangements, such as those described above with respect to FIG. 1, may be used, for example, to obtain a desired electrical load resistance.

Figure 7:
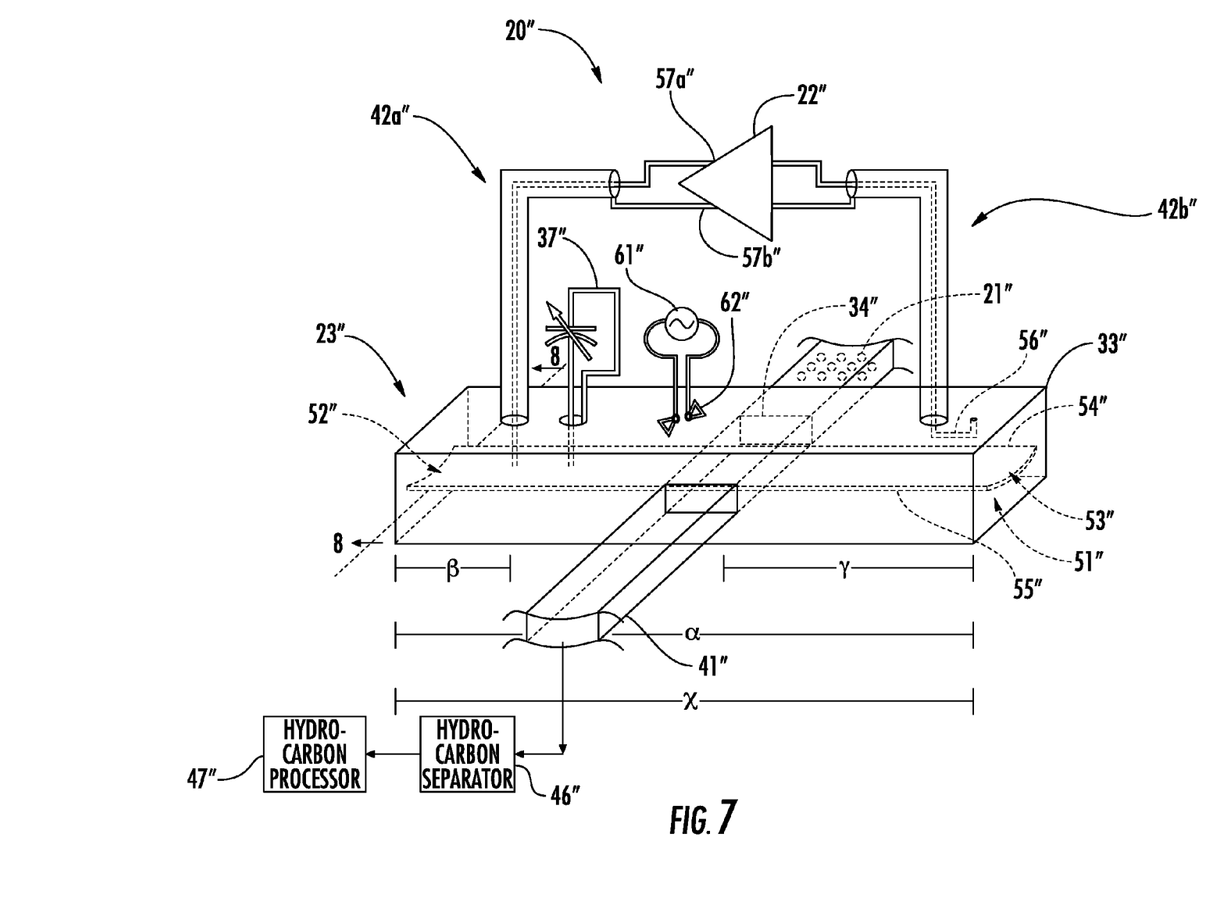
FIG. 7 is a schematic diagram of a portion of an apparatus for processing a hydrocarbon resource in accordance with another embodiment of the present invention.
Figure 8:
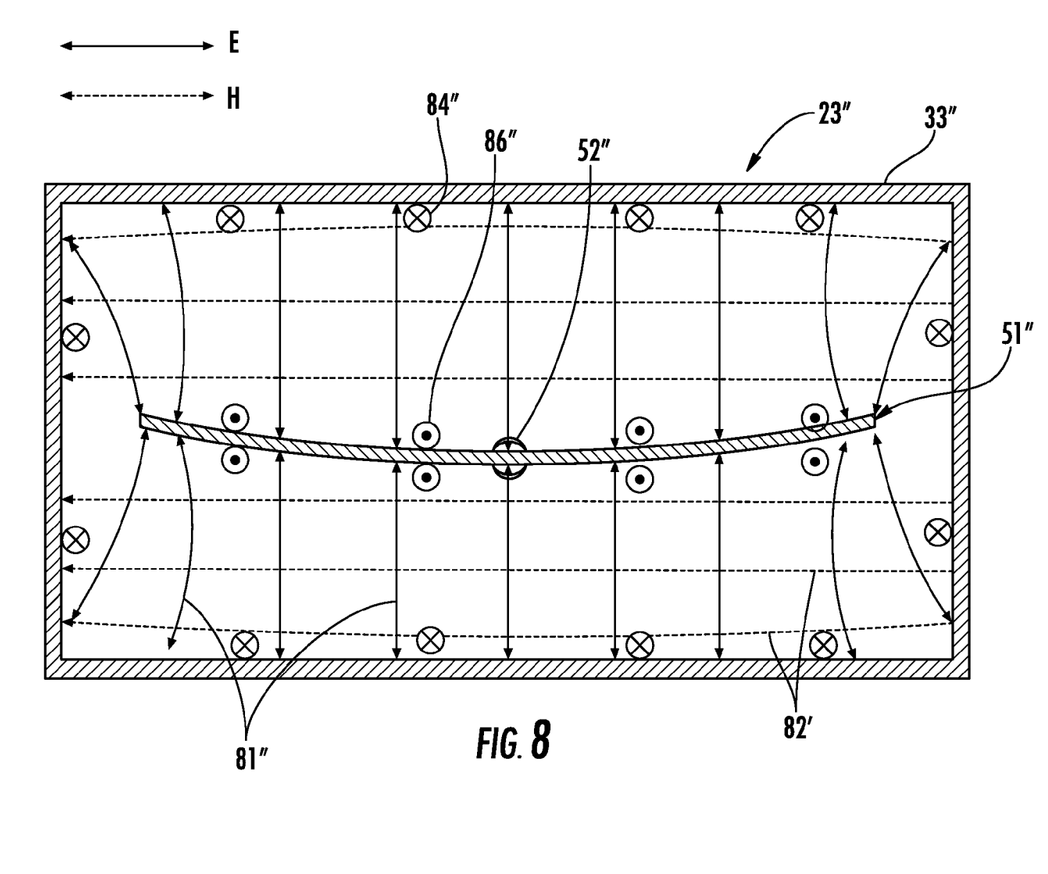
FIG. 8 is an enlarged cross-sectional view including E-fields and H-fields of the portion of the apparatus of FIG. 7 taken along line 8-8.

Referring now to FIGS. 7-8, an apparatus 20" for processing a hydrocarbon resource according to another embodiment is illustrated. The hydrocarbon resource 21" may be transported by conduit 41". Water may be injected into the conduit 41" to serve as a radio frequency heating susceptor, for example, and/or to donate hydroxyl radicals (OH—) to initiate reactions, as will be appreciated by those skilled in the art.

The apparatus 20" includes a radio frequency (RF) source 22" and an RF applicator 23" coupled to the RF source. The RF source 22" is configured to supply RF power at 27 MHz and, more particularly, 27.12 MHz.

The RF source 22" and RF applicator 23" are configured to perform at least one of heating, dehydrating, cracking and hydrogenation of the hydrocarbon resource 21". The RE applicator 23" may be considered as an electrically small structure with most dimensions smaller than one wavelength $\lambda$.

The RE applicator 23" includes an enclosure 33" that is electrically conductive and has a passageway 34" therethrough to accommodate a flow of the hydrocarbon resource 21". The conduit 41" enters and exits the enclosure 33" through the passageway 34" which may include evanescent apertures or holes or openings in the enclosure that are electrically small, e.g. their physical dimensions are small relative the wavelength of the radio frequency oscillations, for example.

The RE applicator 23" also includes a divider 51' that is also electrically conductive and is positioned within the enclosure 33". The divider 51" has an elongate shape with opposing ends 52", 53" coupled to adjacent portions of the enclosure 33". The divider 51" also has opposing sides 54", 55" spaced inwardly from adjacent portions of the enclosure 33". The divider 51" is narrower than the width of the enclosure 33".

The divider 51" illustratively has a convex shape. The divider 51" may be planar, or it may have a concave or other shape to reduce fringing fields or to control electromagnetic field amplitude tapers, as will be appreciated by those skilled in the art. The divider 51" may be another shape. The divider 51" may be a metallic material, such as, for example, a metallic sheet, or other electrically conductive material, as will be appreciated by those skilled in the art.

The elongate dimension $\alpha$ of the divider 51" may be about ½ wavelength at the desired radio frequency, e.g. $\alpha = ck/2f$ where c is the speed of light, k is the loading effect of the hydrocarbon resource 21", and f is the desired radio frequency heating frequency in hertz. For operation at the 27 MHz water antiresonance frequency, $\alpha$ would be about 5.5 meters without any hydrocarbon resource 21' present. The loading effect variable, k, in practice may vary from about 0.4 to 0.9 depending on the dielectric constant and electrical conductivity of the hydrocarbon resource 21".

The RF source 22" may include an RF amplifier, for example, or an active device that amplifies a weak electrical current into a stronger one so an electrical gain is provided. The RF source 22" may include one or more active devices, such as, for example, semiconductor devices or vacuum tubes. An example RF source 22" may be a grounded grid amplifier using a tetrode vacuum tube, for example, the 4CW100000E, manufactured by CPI Eimac and Associates of Palo Alto, Calif. Of course the RF source 22" may also include a power source, such as a DC power source, and/or other components, as will be appreciated by those skilled in the art.

The apparatus 20" is advantageously self exciting, i.e. a radio frequency oscillator is provided in situ by feedback from the RF applicator 23". In a self excitation mode, the RF applicator 23" does double duty as an oscillator tank circuit and a radio frequency heating field applicator. The feedback signal used to drive the RF source 22" or amplifier into oscillation is obtained from a coupling loop 56" or other coupling structure located within the enclosure 33". The feedback signal loops the current through the RF source 22" to produce oscillations at the resonant frequency of RF applicator 23". For example, when the prime power (DC) to the RF source 22" is first turned on, the output of the RF source, or amplifier, may include only noise, which travels around the feedback loop, and is filtered, in frequency, by the RF applicator 23". The RF power quickly becomes a single frequency. Electrical current surges back and forth along the divider 51" with the AC cycle, so the divider 51" functions as a transmission line resonant filter or stripline cavity resonator, for example. The result of the self excitation causes a sine wave of electrical current at the output terminals 57a", 57b" of the RF source 22", although other waveforms may be produced or used. For example, a nonlinear amplifier could be employed and a serrasoid waveform obtained.

First and second coaxial feedlines 42a", 42b" couple the RF source 22" to the divider 51" and the enclosure 33", respectively. The first and second coaxial feed lines 42a", 42b" convey the amplifier output signal and feedback signals to and from the RF applicator 23". Of course, the RF source 22" may not be self exciting, so a fixed frequency oscillator, such as, a quartz crystal oscillator may be used to initiate oscillation. The self excitation/feedback mode advantageously provides frequency autotracking. In other words, the oscillation frequency automatically corresponds to the resonant frequency of the RF applicator 23" for increased efficiency.

The apparatus 20" further includes an auxiliary RF radiating element 62". The apparatus 20" also includes an auxiliary RF source 61" coupled to the auxiliary RF radiating element 62" and configured to operate at a frequency different than a frequency of the RF source 22". More than one auxiliary power source and auxiliary RF radiating element may be used.

The auxiliary RF power source 61" may be tuned to the 18 cm wavelengths of the hydroxyl transition (which are near 1612, 1665, 1667, and 1720 MHz). The auxiliary RF radiating element 62" may be a bowtie dipole antenna, for example, to expose the hydrocarbon resource to electromagnetic fields at the 18 cm wavelengths of the hydroxyl transition. The auxiliary RF radiating element 62" may be another type of antenna or radiating element.

Hydroxyl radical activity may be enhanced by the 18 cm electromagnetic radiation due to initiation reactions, where a single molecule breaks apart into two free radicals, and by other reactions, such as, hydrogen abstraction and radical decomposition, which are also radical based. The auxiliary 18 cm electromagnetic radiation may be applied in addition to the electromagnetic fields from the divider 51".

The radio frequencies used may include the hydroxyl resonance frequencies, which may correspond to the 18 cm wavelengths of the hydroxyl transition which are near 1612, 1665, 1667, and 1720 MHz. The radio frequencies may correspond to the liquid water anti-resonance near 30 MHz, and, more particularly, 27.12 MHZ, which provide increased penetration in the hydrocarbon ore and adjust the dielectric susceptance of the water relative to the hydrocarbon molecules in water-hydrocarbon mixtures.

The RF applicator 23" further includes a tuning member 37" coupled between the enclosure 33" and the divider 51". The tuning member 37" is illustratively a capacitor that is electrically coupled to the divider 51" for tuning and electrical loading.

The apparatus 20" also includes a hydrocarbon separator 46" downstream from the RF applicator 23" and configured to generate hydrocarbon fractions, and a hydrocarbon processor 47" downstream from the hydrocarbon separator and configured to generate at least one liquid fuel from the hydrocarbon fractions. As will be appreciated by those skilled in the art, the apparatus 20" may also include an electromagnetic shield to reduce unwanted radiation for reducing interference to communications, and for reducing electromagnetic radiation exposure, for example.

Operation of the apparatus 20" will now be described. The apparatus 20", and more particularly, the RF applicator 23", functions as a transverse electromagnetic (TEM) transmission line internally. In a preferred embodiment, the length $\alpha$ is approximately half the free space wavelength at the frequency of operation, so $\alpha \approx c/2f$, where c is the speed of light in meters/second, f is the frequency of the oscillations at the RF source 22" in Hertz, and $\alpha$ is in meters. Of course the hydrocarbon resource may affect the length-to-frequency relationship of the RF source 22". This may result in a relatively small reduction of frequency, for example. With self excited oscillations, the length and frequency are automatically adjusted so as more of a hydrocarbon resource is introduced, the frequency typically drifts downwards to follow the RF applicator 23" resonance.

Dimension $\beta$ corresponds to the location where the first coaxial feed line 42a" coupled to the divider 51" from the RF source 22" output. Dimension $\beta$ sets the load resistance seen by the RF source 22", for example. When dimension $\beta$ is small and the coupling location of the first coaxial feed line 42a" is located relatively close to the grounded end 52", the load resistance referred by the RF applicator 23" will typically be relatively small in value. When the coupling location of the first coaxial feed line 42a" is moved away from the grounded end 52", the load resistance referred by the RF applicator 23" is increased. 50 ohms of resistance may be obtained when the $\beta \approx 0.05\alpha$. The resistance response characteristic is that of the tangent function, e.g. r is proportional to $\tan(\pi\beta/\alpha)$.

The electromagnetic fields provided by the embodiments will now be described (FIG. 8). The RF electrical currents 86" on the divider 51" are oriented in the z-axis out of the page at the instant in time examined, and the electrical currents 84" on the inside of the electrically conductive enclosure 33" are oriented in the z-axis into the page, so the X symbol indicates a flux vector into the page and a dot symbol indicates a flux vector out of the page. Electric near fields 81" (E fields) are produced by the flow of electrical currents 84", 86" as they separate charge inside the RF applicator 23". Magnetic near fields 82" (H fields) are produced by the conveyance of charge on the divider 51" and elsewhere.

As will be appreciated by those skilled in the art, the RF applicator 23" produces straight flux line orthogonal E and H fields of uniform amplitude over most of the interior of the enclosure 33". This advantageously provides uniform application of the electric and magnetic fields to the hydrocarbon material 21". Indeed the orthogonal characteristics of a planar electromagnetic wave are synthesized in an enclosure that may be electrically small and evanescent, which is another advantage.

A method aspect will now be described. The method is for the adjustment of field impedance in Ohms so that stronger or weaker electric and magnetic fields can be adjusted. $\gamma$ is the distance from end of the RF applicator 23" and the conduit 41", or the hydrocarbon resource 21" (FIG. 7). The dimension $\gamma$ may be particularly important as it adjusts the field impedance Z applied to the hydrocarbon resource 21". The field impedance is the ratio of the amplitudes of the E and H field components that are applied to the hydrocarbon resource, i.e. ore, so that Z=E/H where Z is the electromagnetic field impedance, E is the intensity of the electric field in volts/meter, and H is the intensity of the magnetic field in amperes/meter. When $\gamma$ is relatively small in value, and the conduit 41" is near the grounded end 53", the electric field impedance may be relatively low, and relatively strong magnetic fields are applied to the hydrocarbon resource 21". When $\gamma=\alpha/2$ the conduit 41" is in the center in the RF applicator 23", or enclosure 33", the field impedance is high and relatively strong electric fields and weak magnetic fields are applied to the hydrocarbon resource 21".

This may be particularly advantageous over the prior art whose electromagnetic field impedance was unadjustable and generally 377 Ohms due to the formation of waves. In the RF applicator 23", quasistationary, reactive, near fields are applied in preference to far field waves.

As described in co-pending patent application Ser. No. 13/079,279, filed Apr. 4, 2011, which is assigned to the present assignee, and wherein the entire contents of which are herein incorporated by reference, magnetic fields having an amplitude of 7 amps per meter were applied to rich Athabasca oil sand for 18 minutes, and the aromatic content of the ore was reduced from 32.2% to 0.96%. The apparatus 20" provides a surface plant for the purposes of the aromatic to polar molecule conversion in rich Athabasca oil sand.

Electric near fields of 1600 volts per meter have been tested on pipeline grade bitumen (i.e., dilbit) with significant molecular cracking at a temperature below the boiling temperature of water at sea level. The application of radio frequency electromagnetic fields may provide a bulk low temperature steam cracker for hydrocarbons because the kinetic energy of the water molecules in-situ in the water-hydrocarbon mix are greatly raised by the electromagnetic fields. The kinetic energy of molecules is of course the temperature of the material. Thus, the radio frequency relative to the water antiresonance frequency may be adjusted to near 30 MHz, and more particularly, 27.12 MHz, to adjust the reactivity of the water or hydroxyl radical in the hydrocarbons. As will be appreciated by those skilled in the art, radio frequency electromagnetic fields typically provide a catalyst effect to increase the speed of chemical reactions, and the radio frequency electromagnetic fields may selectively increase the activity of one molecular species over another in the reaction according to molecular dielectric constant, molecular magnetic moment, selected radio frequency, applied field type electric or magnetic.

Another method aspect is directed to a method for processing a hydrocarbon resource 21". The method includes applying radio frequency (RF) power from an RF source 22" to an RF applicator 23" coupled to the RF source. The RF applicator 23" includes an enclosure 33" being electrically conductive and having a passageway 41" therethrough to accommodate a flow of the hydrocarbon resource, and a divider 51" being electrically conductive and positioned within the enclosure. The method further includes flowing the hydrocarbon resource 21" through the passageway 41" to process the hydrocarbon resource with the RF power.

The embodiments described herein are particularly advantageous for ore dehydration (water removal) at frequencies away from the 27 MHz water antiresonance frequency. Further details of RF heating may be found in application Ser. No. 12/835,331, filed Jul. 13, 2010, which is also assigned to the assignee of the present application, and the entire contents of which are herein incorporated by reference.

As will be appreciated by those skilled in the art, cogeneration techniques may be used in conjunction with the embodiments described herein to further increase process efficiency. For example, waste heat from electrical power generation may be used to conductively preheat the hydrocarbon resource 21" prior to or during treatment with RF electromagnetic energy.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An apparatus for processing a hydrocarbon resource comprising:
    a radio frequency (RF) source; and
    an RF applicator coupled to said RF source and comprising
        an electrically conductive base member, and
        first and second electrically conductive elongate members having proximal ends coupled to said electrically conductive base member and extending outwardly therefrom in a generally parallel spaced apart relation, said first and second electrically conductive elongate members having distal ends configured to receive the hydrocarbon resource therebetween; and
    an electrically conductive enclosure surrounding said RF applicator, said electrically conductive enclosure having a passageway therethrough aligned with the distal ends of said first and second electrically conductive elongate members to accommodate a flow of the hydrocarbon resource therebetween.

2. The apparatus according to claim 1 wherein said RF source and said RF applicator are configured to generate electrical fields between the distal ends of said first and second electrically conductive elongate members to perform at least one of heating, dehydrating, cracking and hydrogenation of the hydrocarbon resource.

3. The apparatus according to claim 1 wherein said RF applicator further comprises at least one tuning member coupled between said first and second electrically conductive elongate members.

4. The apparatus according to claim 1 further comprising a coaxial feedline coupling said RF source to said first and second electrically conductive elongate members.

5. The apparatus according to claim 1 wherein said RF source is configured to supply RF power at 27 MHz.

6. The apparatus according to claim 1 further comprising a hydrocarbon separator downstream from said RF applicator and being configured to generate hydrocarbon fractions.

7. The apparatus according to claim 6 further comprising a hydrocarbon processor downstream from said hydrocarbon separator and being configured to generate at least one liquid fuel from the hydrocarbon fractions.

8. The apparatus according to claim 1 wherein the hydrocarbon resource comprises at least one of oil sand, bitumen, pipeline diluted bitumen, crude oil, and synthetic crude oil.

9. An apparatus for processing a hydrocarbon resource comprising:
    a radio frequency (RF) source;
    an RF applicator coupled to said RF source and comprising
        an electrically conductive base member, and
        first and second electrically conductive elongate members having proximal ends coupled to said electrically conductive base member and extending outwardly therefrom in a generally parallel spaced apart relation, said first and second electrically conductive elongate members having distal ends configured to receive the hydrocarbon resource therebetween, and
        first and second electrically conductive plates and coupled to respective distal ends of said first and second electrically conductive elongate members; and
    an electrically conductive enclosure surrounding said RF applicator, said electrically conductive enclosure having a passageway therethrough aligned with the distal ends of said first and second electrically conductive elongate members to accommodate a flow of the hydrocarbon resource therebetween.

10. The apparatus according to claim 9 wherein said RF source and said RF applicator are configured to generate electrical fields between the distal ends of said first and second electrically conductive elongate members to perform at least one of heating, dehydrating, cracking and hydrogenation of the hydrocarbon resource.

11. The apparatus according to claim 9 wherein said first and second plates are arranged in parallel opposing relation.

12. The apparatus according to claim 9 wherein said RF applicator further comprises at least one tuning member coupled between said first and second elongate members.

13. The apparatus according to claim 9 further comprising a coaxial feedline coupling said RF source to said first and second electrically conductive elongate members.

14. A method for processing a hydrocarbon resource comprising:
    applying radio frequency (RF) power from an RF source to an RF applicator coupled to the RF source, the RF applicator comprising
        an electrically conductive base member conductive, and
        first and second electrically conductive elongate members having proximal ends coupled to the electrically conductive base member and extending outwardly therefrom in a generally parallel spaced apart relation, the first and second electrically conductive elongate members having distal ends;
    flowing the hydrocarbon resource between the distal ends to process the hydrocarbon resource with the RF power; and
    flowing the hydrocarbon resource through a passageway in an enclosure being electrically conductive and surrounding the RF applicator, the passageway being aligned with the distal ends of the first and second elongate members.

15. The method according to claim 14 wherein applying RF power comprises applying RF power so that the RF source and the RF applicator cooperate to generate electrical fields between the distal ends of the first and second electrically conductive elongate members to perform at least one of heating, dehydrating, cracking and hydrogenation of the hydrocarbon resource.

16. The method according to claim 14 wherein applying the RF power comprises applying the RF power at 27 MHz.

17. The method according to claim 14 further comprising generating hydrocarbon fractions using a hydrocarbon separator downstream from the RF applicator.

18. The method according to claim 17 further comprising generating at least one liquid fuel from the hydrocarbon fractions using a hydrocarbon processor downstream from the hydrocarbon separator.

* * * * *